Patented Aug. 23, 1932

1,873,340

UNITED STATES PATENT OFFICE

ROBERT L. SCOLLARD AND THOMAS D. KETCHBAW, OF CHICAGO, ILLINOIS, ASSIGNORS, BY MESNE ASSIGNMENTS, TO KAYNESS CORPORATION, OF CHICAGO, ILLINOIS, A CORPORATION OF ILLINOIS

CAST IRON WELDING ELECTRODE AND COMPOSITION FOR COATING SAME

No Drawing.  Application filed February 15, 1930. Serial No. 428,822.

This invention relates to welding electrodes and to a composition of material for coating same.

The present invention relates particularly to a coated electrode adapted for use in the welding of cast iron by use of the electric arc, a method much preferred in most instances to the oxyacetylene method.

Heretofore, in the welding of cast iron, particularly by use of the electric arc, considerable difficulty has been experienced in obtaining a weld or fusion of metals which could be suitably machined or otherwise worked in a manner to restore a casting, or the like, to substantially its original form and condition whereby the device might function in the manner for which it was designed.

It has been found that in welding cast iron, particularly by use of the electric arc, some of the ingredients essential to machinability of cast iron is removed from or destroyed in that portion of the casting adjacent the weld due to the intense heat of the arc, and unless these ingredients or constituent elements are replaced, the resulting product cannot be readily machined or shaped to give it the desired form to enable it to perform the functions for which it was intended. This, probably, has been one of the greatest draw-backs or hindrances in the development of the art of welding cast iron by use of the electric arc.

A principal object of the present invention, therefore, is to provide an electrode possessing a desirable quantity of the ingredients so destroyed or removed, and capable of depositing them electrically and fusing them into the material operated on during the welding operation.

Another object of the present invention is to provide a welding rod having suitable quantities of carbon and silicon to replace the elements of like or similar character destroyed or removed from the material of the casting or work operated upon.

Another object of the invention is to provide a composition of materials for coating a cast iron electrode in a manner to provide the desirable ingredients to produce a weld that may be machined substantially in the same manner that ordinary cast iron may be treated.

A further object of the invention is to provide a cast iron electrode coated with a specially prepared flux containing alloying element, and which will produce a strong, fine, even grained weld that is free from hard spots and is readily machinable.

A still further object of the invention is to improve devices of the character described in sundry details hereinafter referred to and particularly pointed out in the appended claims.

The present invention contemplates an electrode for use in the welding of cast iron by the electric arc method, and in its preferred embodiment comprises a cast iron rod of suitable length and form, and having a coating applied thereto consisting of a composition containing suitable quantities of carbon and silicon combined with a suitable binder.

More specifically, the present invention contemplates a welding rod having incorporated into its structure, sufficient quantities of carbon and silicon to offset the destructive action of the electric arc on like elements originally embodied in the material operated upon. These ingredients may be combined with others, such as manganese, phosphorus, sulphur and pure iron to provide a strong, rigid electrode suitable for shipping and handling in the process of welding cast iron by use of the electric arc.

The present invention contemplates a welding rod having these elements present in its structure in substantially the following proportions by weight:

| | Per cent | | Per cent |
|---|---|---|---|
| Carbon | 5.25 | to | 6.0 |
| Silicon | 2.6 | " | 4.0 |
| Manganese | .5 | " | .6 |
| Phosphorus | .5 | " | .6 |
| Pure iron | 91.15 | " | 88.8 |

A welding rod containing the elements above noted in substantially the proportions indicated may also contain a trace of sulphur, and, depending on the manner of incorporating the various elements into the rod, may contain a trace of some suitable vegetable or mineral binder material preferably, as in the contemplated structure, sodium silicate. It will be understood, however, that binders of any other suitable material may be employed with equally desirable results.

In practice, and, as a result of extensive experiments covering the use of a wide range of materials, a welding rod found to be most efficient in obtaining the result desired, namely, a welded joint that is readily machinable, contains the ingredients or elements above noted in approximately the following proportions by weight:

| | Per cent |
|---|---|
| Carbon | 5.76 |
| Silicon | 3.9 |
| Manganese | .55 |
| Phosphorus | .55 |
| Pure iron | 89.24 |
| Sulphur | Trace. | and, as above noted, possibly a trace of binder material, preferably, sodium silicate.

A welding electrode of the character described may be constructed in various ways, as, for example, by combining the elements in a metallic rod, or by coating a metallic rod with a composition consisting of certain of the materials above noted, for example, extremely favorable results have been obtained by the use of a welding electrode comprising a cast iron rod of suitable dimensions having a coating applied thereto comprising a composition containing carbon in amounts ranging from 75.0% to 92.0% by weight, and silicon in amounts ranging from 8.0% to 25.0% by weight. A composition found to be most desirable contains these ingredients in the following proportions: Carbon 88.5% and silicon 11.5%. In a coating of the character disclosed, a trace of binder material may be found, which is employed to bind the ingredients together and to cause the coating to adhere to the rod. A suitable binder for this purpose may be found in the use of a suitable quantity of sodium silicate.

A preferred method of preparing the coating for application to a cast iron rod is to combine the desired quantity of carbon in the form of graphite, powdered charcoal, plumbago, lamp black, etc., with the desired quantity of silicon in the form of silica flour, ferro silicon, etc., and to this mixture add a sufficient quantity of binder material, for example, sodium silicate which has been diluted with pure water to preferably a specific gravity of approximately 1250. The ingredients should then be thoroughly mixed until all lumps are dissolved, and the mixture then allowed to stand for approximately five hours. This method of handling the ingredients insures a uniform evenly mixed pasty material of a creamy consistency which may be readily applied to a cast iron metallic rod, or the like, and when permitted to dry, provides a substantial, hard and firm coating which will not chip off in ordinary use and handling.

It is recommended that no new mixture be added to a mixture that has stood more than five or six hours, and that no mixture be used that has stood for a period of forty-eight hours or more.

Best results have been obtained, in the welding of cast iron by use of the electric arc, when the work or member to be welded forms the negative electrode and the welding rod, the positive electrode, and when a rod of the character above described is employed in such manner, the action of the arc causes the carbon and silicon content of the rod to be reduced to, and deposited, by the arc, on the negative electrode in a condition to readily flow and thoroughly alloy with the material thereof, and, by reason of the carbon and silicon deposit, provides a strong homogeneous weld, devoid of hard spots, and which may be readily machined for restoring the work or welded member to its original form and condition for further use.

It will be obvious that the present invention is not limited to the precise construction, proportions, and composition of materials specifically mentioned, as these may be varied without departing from the spirit and scope of our invention. Moreover, all of the ingredients mentioned need not be combined in a single composition, as certain of the ingredients may be combined in variously different combinations and sub-combinations.

Having thus described my invention, what we claim as new and desire to secure by Letters Patent is:

1. An electrode for arc welding comprising a metal core having a coating containing carbon by weight of 75.0% or more, silicon by weight of from 8.0% to 25.0%, and a binder.

2. An electrode for arc welding comprising a metal core having a coating containing carbon by weight of 75.0% or more, silicon by weight of approximately 11.5%, and a binder.

3. An electrode for arc welding comprising a metal core having a coating containing the following ingredients by weight in substantially the following proportions: Carbon, at least 75.0%, silicon at least 8.0%, and a trace of binder material.

4. An electrode for arc welding comprising a metal core having a coating containing the following ingredients by weight in substantially the following proportions: Carbon from 75.0% to 92.0%, silicon from 8.0% to 25.0%, and a trace of binder material.

5. An electrode for arc welding comprising a metal core having a coating containing the following ingredients by weight in substantially the following proportion: Carbon approximately 88.5%, silicon approximately 11.5%, and a trace of binder material.

6. An electrode for arc welding comprising a cast iron core having a coating containing the following ingredients by weight in substantially the following proportions, at least 75.0% carbon, preferably in the form of powdered willow charcoal, at least 8.0% silicon, and a binder material.

In witness whereof, we hereunto subscribe our names this 1st day of February, A, D. 1930.

ROBERT L. SCOLLARD.
THOMAS D. KETCHBAW.